Dec. 6, 1966  F. SMAI ETAL  3,290,115
PROCESS FOR PRODUCING NITROSYL CHLORIDE
Filed Dec. 24, 1962
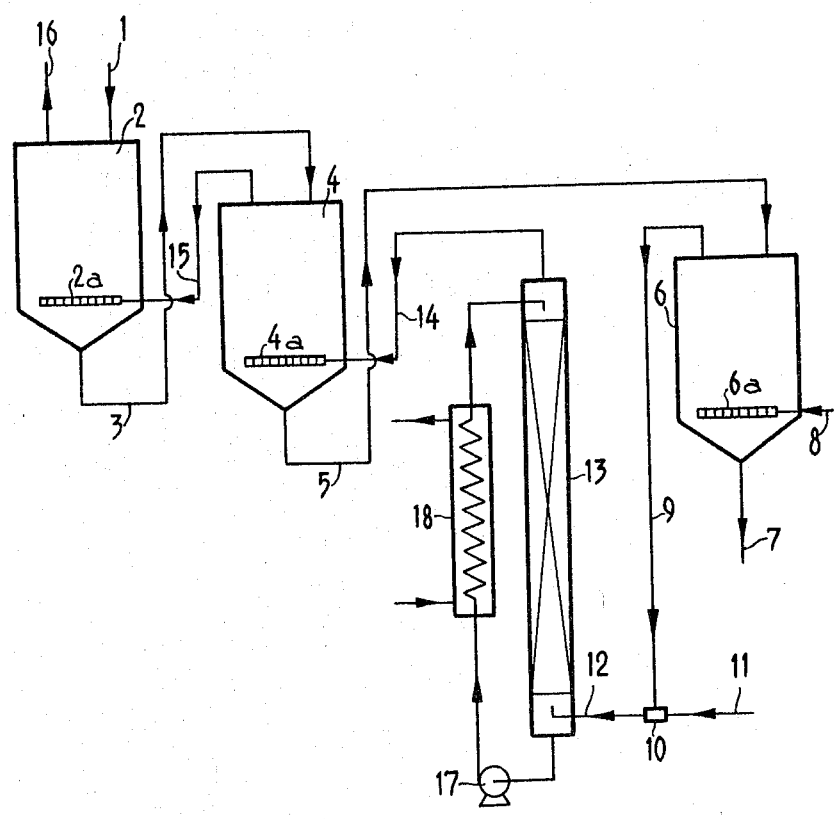

PROCESS FOR PRODUCING NITROSYL CHLORIDE

Franco Smai and Angelo Mari, Milan, Italy, assignors, by mesne assignments, to Edison, Milan, Italy, a corporation of Italy
Filed Dec. 24, 1962, Ser. No. 246,762
Claims priority, application Italy, Dec. 22, 1961, 23,108/61
1 Claim. (Cl. 23—203)

This invention relates to the production of nitrosyl chloride by reacting a nitrogen oxide with hydrogen chloride.

The known commercial processes of the above character involve contacting nitric oxide (NO) with gaseous hydrogen chloride (HCl) at a temperature between 300°–500° C. according to one or more of the following reactions:

$$4NO + 4HCl + O_2 \rightarrow 4NOCl + 2H_2O$$

$$2NO + 3HCl + HNO_3 \rightarrow 3NOCl + 2H_2O$$

$$NO + 2HCl + NO_2 \rightarrow 2NOCl + H_2O$$

$$4NO + 6HCl + N_2O_5 \rightarrow 6NOCl + 3H_2O$$

Substantial amounts of water are formed in each of the above depicted reactions. To separate out the water, the reaction products (comprising unreacted amounts of hydrogen chloride and nitric acid) are cooled in costly heat exchangers of an acid-resisting material such as titanium and its alloys. Moreover, the high-temperature reaction (300°–500° C.) involves a substantial consumption of heat and requires furnaces of a material capable of resisting the deleterious action of nitrosyl chloride at such a high temperature.

Nitrosyl chloride is also produced by treating aqueous hydrochloric acid with nitric acid and heating the so obtained mixture; a known reaction of "aqua regia"

$$3HCl + HNO_3 \rightarrow NOCl + Cl_2 + 2H_2O$$

takes place, developing a moist gaseous mixture containing nitrosyl chloride and chlorine in equimolar proportions; their subsequent condensation and separation by distillation clearly involves drawbacks similar to those just recalled hereinbefore.

This invention provides a process by which nitrosyl chloride can be commercially produced without involving the above mentioned drawbacks. The process is essentially based on the discovery that appreciably pure nitrosyl chloride is obtained with a good yield by reacting aqueous hydrochloric acid with gaseous nitrogen dioxide (either pure or diluted with inert gases, such as nitrogen) at a temperature between 20° and 70° C., a relatively concentrated aqueous nitric acid being obtained at the same time as sub-product. Apparently, in the instant process, nitrogen dioxide and hydrogen chloride directly react with each other according to a scheme:

$$2NO_2 + HCl \rightarrow NOCl + HNO_3$$

in which nitrosyl chloride evolves as gaseous reaction product while the nitric acid formed dissolves in the aqueous phase (aqueous hydrochloric acid) present. The reaction goes well ahead at normal pressure.

Especially when pure nitrogen dioxide is employed, the nitrosyl chloride obtained is of a high purity such, that it can be directly employed in organic nitroso-chlorinating processes, for example, without necessitating condensation or fractional distillation involved by prior methods referred to hereinbefore.

Operation at temperatures as low as 20°–70° C. avoids the consumption of large power amounts for heating and cooling purposes and, at the same time, the heat-exchange apparatus necessary for the temperature control can be made of relatively inexpensive materials, such as glass, enameled- or porcelain-coated iron, synthetic plastics, etc.

A further advantage resides in that use can be made of aqueous hydrochloric acid solutions obtainable as by-products in many organic chlorinating processes in which gaseous chlorine is entrapped in water and in which the resulting hydrochloric acid solution is generally discarded after having been neutralized with limestone.

A still further advantage of the process of this invention resides in its high flexibility, for it is largely independent both from the hydrochloric acid concentration in the solution and from the purity of the nitrogen dioxide employed; the latter can be accompanied by other nitrogen oxides, such as $N_2O_3$, $N_2O_4$, $N_2O_5$, and even nitric oxide (NO), as will be seen hereinafter, without prejudicing the commercial value of the process. The nitric acid obtained as by-product is of a high purity and concentration (about 50% by weight or even more), so that it can immediately be employed for various technical uses.

In its broadest embodiment, the process according to this invention is characterized in that gaseous nitrogen dioxide is intimately contacted at a temperature between 20° and 70° C. with aqueous hydrochloric acid. The intimate contact is advantageously established by causing the nitrogen dioxide to bubble through the aqueous hydrochloric acid in a reaction vessel. The operation is advantageously carried out in a continuous manner, by continuously supplying to the vessel the two reactants and simultaneously withdrawing from the vessel a gaseous reaction product comprising nitrosyl chloride and a liquid reaction product essentially consisting of aqueous nitric acid. The reaction vessel can be in the form of a column (of the tray- or packed-type) to a top and a bottom section of which the aqueous hydrochloric acid and nitrogen dioxide, respectively, are supplied; or the vessel can be in the form of a container equipped with a bubbler in its bottom section through which nitrogen dioxide is blown into the aqueous hydrochloric acid in the container. It is often advantageous to provide a pair of such containers or "reactors" in a counter-current arrangement: aqueous hydrochloric acid is supplied to a first reactor and the liquid reaction product (containing any unreacted acid) obtained in the reactor provides a feed for the second reactor, while at the same time gaseous nitrogen dioxide is supplied to the second reactor and the gaseous reaction products obtained in the latter provides the gaseous feed for the first reactor, the gaseous nitrosyl chloride product and aqueous nitric acid being withdrawn from the first and the second reactor, respectively. It is to be understood that more than two reactors may be employed in a counter-current arrangement.

In a preferred embodiment of this invention three reactors in counter-current arrangement are employed providing a three-stage plant. Aqueous hydrochloric acid is continuously supplied to a third stage reactor, while gaseous nitrogen dioxide is continuously supplied to the first-stage reactor. Since the liquid reaction product obtained in the second-stage reactor is rather weak in hydrochloric acid, its subsequent contact with nitrogen dioxide in the first-stage reactor primarily results in a $NO_2$-reaction with water forming nitric acid and nitric oxide NO, which latter is ineffective in the instant process. Thus, according to a preferred embodiment of the invention, the gaseous reaction products obtained in the first-stage reactor which include the nitric oxide formed in the reactor are forwarded to the second-stage reactor through an oxidation zone, wherein the products are intimately contacted with molecular oxygen at a temperature between 20° and 70° C., whereby the nitric oxide is oxidized to nitrogen dioxide. The oxidation reaction is exothermic; it is therefore necessary to cool the oxidation zone thereby to control the temperature therein. Direct contact cooling is preferably adopted by circulating through the oxidation zone an inert liquid coolant in intimate contact with both the gaseous reactants and reaction product, whereby any local overheatings are prevented. It is also advantageous, to that end, to supply the first-stage reactor with dilute nitrogen dioxide instead of pure dioxide; gaseous nitrogen is advantageously employed as diluent.

A convenient source of $N_2+NO_2$ mixture for the purposes of this invention is ammonia. In an embodiment of this invention, ammonia is catalytically oxidized with molecular oxygen (air) according to a conventional technique of nitric acid production, yielding a combustion product mainly comprising nitrogen and nitrogen dioxide (the latter being obtained owing to excess oxygen reacting with nitric oxide initially produced on oxidation). Such a combustion product provides an excellent $NO_2$-feed for the reaction with aqueous hydrochloric acid in the instant process.

Further details of this invention will be described with reference to the accompanying drawing, which is a scheme of a plant for carrying out a preferred embodiment of the instant process.

The plant shown on the drawing comprises three reactors 2, 4 and 6, respectively, each of which comprises a vessel of a ceramic material or glass equipped with a bubbler 2a, 4a and 6a, respectively. Aqueous hydrochloric acid, at a concentration preferably between 20% and 37% (by weight) is continuously supplied to reactor 2 which functions in effect as said third reaction zone through its supply conduit 1, and the aqueous reaction product is withdrawn from a bottom section of the reactor 2 through a discharge conduit 3 opening into a top section of the recator 4 or the second reaction zone; similarly, the aqueous reaction product in the reactor 4 is withdrawn from a bottom section of the latter through a discharge conduit 5 opening into a top section of the reactor 6 or the first reaction zone, from which the aqueous reaction product is withdrawn through a discharge conduit 7. As will be seen hereinafter, the latter reaction product chiefly comprises aqueous nitric acid and a residual proportion of hydrochloric acid. It is moreover evident from the drawing that the reactors 2, 4 and 6 are in a "series arrangement" with respect to the flow of the aqueous reaction product originating from the initial aqueous hydrochloric acid supplied to the reactor 2.

Gaseous products evolving in the reactor 2 are recovered through a conduit 16; as will be seen hereinafter, said products comprise the desired nitrosyl chloride.

Gaseous products evolving in the reactor 4 are delivered to the bubbler 2a in the reactor 2 through a conduit 15 communicating with a top portion of the reactor 4.

Gaseous nitrogen dioxide ($NO_2$) is continuously supplied to the bubbler 6a in the reactor 6 through a conduit 8. Since the aqueous reaction product entering the reactor 6 is relatively poor in hydrogen chloride (about 5% by weight), a substantial proportion of the nitrogen dioxide introduced into the reactor 6 reacts with water according to the equation:

$$3NO_2+H_2O \rightarrow NO+2HNO_3$$

whereby nitric acid is formed in the reactor and whereby the gaseous reaction product issuing from a top section of the reactor consists of a mixture of nitrosyl chloride and nitric oxide. Said gaseous mixture is supplied through a conduit 9 to a mixing valve 10 to which there is added a metered amount of gaseous oxygen supplied through a conduit 11; the resulting mixture is delivered through a conduit 12 to a bottom section of an oxidizing column 13 containing a Raschig ring filling. The metered amount of oxygen is that stoichiometrically necessary for the reaction:

$$2NO+O_2 \rightarrow 2NO_2$$

the exothermic heat of which is carried away in column 13 by circulating therethrough an inert cooling liquid, such as aqueous nitric acid at about 60% concentration; the acid is withdrawn from the bottom section of the column by means of a pump 17 and is recirculated to a sprinkler in a top section of the column via a cooler 18. The operation of the cooler 18 is advantageously adjusted to maintain in the column 13 a temperature of about 30° C., so that the gaseous oxidation products issue from the column at said temperature, said products mainly comprising nitrogen dioxide, nitrosyl chloride and a residual proportion (if any) of nitric oxide.

The temperature of the gaseous products throughout the process is advantageously maintained above 20° C., thereby to avoid condensation of nitrogen dioxide, but is below 70° C. to thereby avoid decomposition of nitrosyl chloride to chlorine and nitric oxide.

The gaseous products issuing from the column 13 are supplied through a conduit 14 to the bubbler 4a in the reactor 4, wherein nitrogen dioxide reacts with hydrochloric acid yielding nitrosyl chloride. The unreacted nitrogen dioxide and gaseous reaction products leave the reactor 4 through a conduit 15 and are introduced to the bubbler 2a in the reactor 2 in which said unreacted nitrogen dioxide is exhausted by the freshly supplied aqueous hydrochloric acid. The temperature in the reactor 2 is advantageously below 30° C. thereby to avoid stripping of hydrogen chloride by the gases bubbling in the reactor; the latter condition is, however, not critical for the efficiency of the process.

Summarizing, it will be seen that, in the embodiment just described, aqueous hydrochloric acid and nitrogen dioxide are led in countercurrent through a plurality of distinct reaction zones in which they are intimately contacted to react with each other and the gaseous and liquid reaction products are separated from each other; the gaseous reaction products in the last-stage zone (as referred to the flow of aqueous hydrochloric acid) are forwarded to the preceding zone through an oxidation zone wherein nitric oxide contained in the last named products is oxidized with oxygen to nitrogen dioxide; and the ultimate gaseous reaction product containing nitrosyl chloride is recovered from the first-stage reaction zone, an aqueous nitric product being recovered from the last-stage zone.

Example 1

An aqueous hydrochloric acid solution at a 37% (by weight) concentration is continuously supplied to the reactor 2 in the plant described, at a rate of 986 grams/hour, while 940 grams per hour nitrogen dioxide and 24 liters/hour oxygen are supplied through conduits 8 and 11, respectively. A constant temperature of 25° C. and atmospheric pressure are maintained throughout the apparatus.

The liquid reaction product discharged from the reactor 6 through the conduit 7 consists of 1288 grams/hour aqueous solution containing 52% $HNO_3$ and 0.06% HCl; 640.8 grams/hour gaseous reaction product are recovered from the first-stage reactor 2 through the conduit 16, the product comprising 96 vol. percent NOCl, about one vol. percent hydrochloric acid and chlorine, about one vol. percent nitric oxide and nitrogen dioxide, and about 2% humidity.

The NOCl yield with respect to the original hydrochloric acid (HCl) is 96%; a 47% proportion of the original nitrogen dioxide has been transformed to nitrosyl chloride, and a 51.9% proportion of the nitrogen dioxide has been transformed to nitric acid.

Example 2

Gaseous ammonia is catalytically oxidized with air (in a manner known per se in the nitric acid production technique) to obtain a gaseous combustion product comprising 10% nitrogen dioxide (the remaining 90% proportion mainly consisting of nitrogen gas).

Said combustion product is continuously supplied to the reactor 6 through conduit 8 and bubbler 6a at a rate of 370 liters/hour, while aqueous hydrochloric acid at a 30% concentration is continuously supplied to the reactor 2 at a rate of 100 grams/hour. Other conditions are the same as in Example 1.

The gaseous reaction product issuing from conduit 16 is washed with a 60% nitric acid in a small Raschig ring packed column (not shown); the washed product has a following composition: 4.7% NOCl, 0.1% Cl, 0.1% NO₂, 0.2% HCl, balance nitrogen, the percentages being by volume. Nitric acid at about 52% concentration, containing an HCl residue lower than 0.08%, is obtained from the conduit 7. An 85% proportion of the original HCl has been converted to nitrosyl chloride; a 45% proportion of the original nitrogen dioxide has been converted to nitrosyl chloride, the remaining 55% proportion being recovered as nitric acid.

What we claim is:

A process for continuously producing chlorine free nitrosyl chloride by the reaction involving three zones in sequence of a gas comprising nitrogen dioxide and aqueous hydrogen chloride comprising (a) intimately contacting said gas counter-currently in a first reaction zone with an aqueous acid solution containing 5% by weight hydrochloric acid and about 50% by weight nitric acid at a temperature in the range of from 20° to 70° C.;

(b) oxidizing the gaseous reaction products from the first reaction zone comprising nitrosyl chloride, nitric oxide and unreacted nitrogen dioxide at a temperature of 20° to 70° C., to convert the nitric oxide to nitrogen dioxide while concurrently (c) cooling said gaseous reaction products during oxidation by contact with an aqueous nitric acid solution containing about 60% by weight HNO₃;

(d) separately collecting from said first reaction zone a liquid reaction product consisting essentially of aqueous nitric acid having a concentration of about 50% by weight;

(e) then intimately contacting the oxidized gaseous reaction product in a second reaction zone with aqueous hydrochloric acid having an intermediate concentration between that in said first reaction zone and the third reaction zone, at a temperature in the range of from 20° C. to 70° C. to obtain nitrosyl chloride as a gaseous product and conducting the liquid product from said second reaction zone which comprises aqueous hydrochloric acid having a concentration of about 5% for reaction with said gas in the first reaction zone (f) then contacting said gaseous reaction products from said second reaction zone which mainly consist of nitrosyl chloride and unreacted nitrogen dioxide countercurrently with aqueous hydrochloric acid having a concentration between 20% and 37% in a third reaction zone at a temperature in the range of from 20° C. to 70° C., thereby increasing the proportion of nitrosyl chloride in the gaseous product; and (g) recovering from said third reaction zone the gaseous product thus enriched with nitrosyl chloride.

References Cited by the Examiner

UNITED STATES PATENTS

| | | | |
|---|---|---|---|
| 1,717,951 | 6/1929 | Taylor | 23—203 |
| 1,920,333 | 8/1933 | Whittaker et al. | 23—203 |
| 2,135,733 | 11/1938 | Richardson | 23—203 |
| 2,185,579 | 1/1940 | Beekhuis | 23—162 |
| 2,240,668 | 5/1941 | Reed | 23—157 X |
| 2,309,919 | 2/1943 | Reed | 23—157 |
| 2,366,518 | 1/1945 | Grebe et al. | 23—203 |
| 2,855,279 | 10/1958 | Walter. | |
| 3,081,153 | 3/1963 | Parsons | 23—162 |

MILTON WEISSMAN, *Primary Examiner.*

MAURICE A. BRINDISI, OSCAR R. VERTIZ,
*Examiners.*

B. H. LEVENSON, *Assistant Examiner.*